Aug. 19, 1969
G. E. S. KING
3,462,544
ELECTRICAL CONDUCTORS WITH A HEAT RESISTANT
ELECTRICAL INSULATION SYSTEM
Filed Aug. 29, 1967
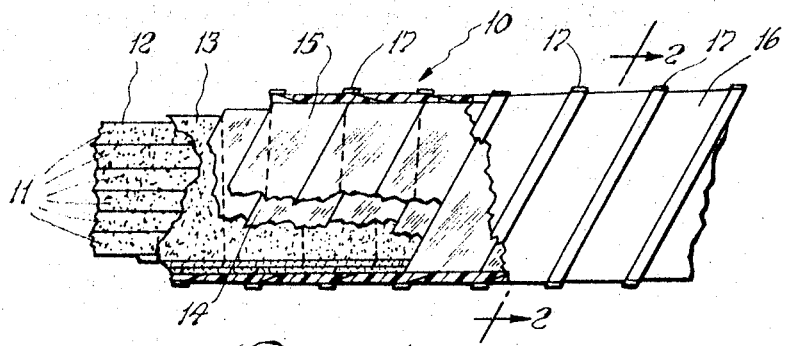
Fig. 1
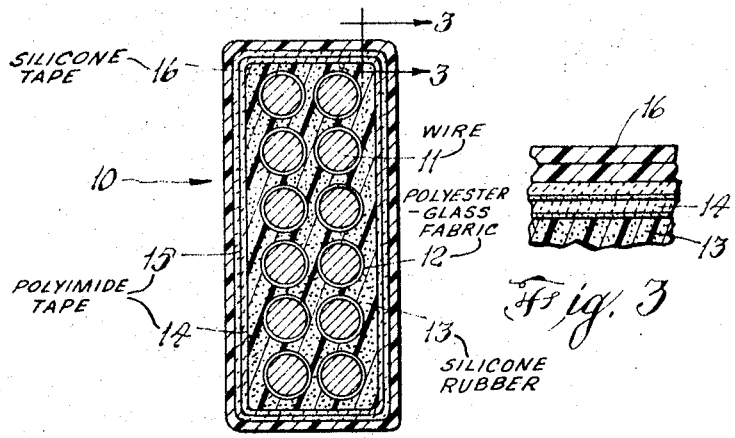
Fig. 2
Fig. 3
INVENTOR.
GEORGE E. S. KING
BY Ernest J. Weinberger
Louis B. Appleton
ATTORNEYS United States Patent Office 3,462,544
Patented Aug. 19, 1969

---

3,462,544
ELECTRICAL CONDUCTORS WITH A HEAT RESISTANT ELECTRICAL INSULATION SYSTEM
George E. S. King, East Elmhurst, N.Y., assignor to the United States of America as represented by the Secretary of the Navy
Filed Aug. 29, 1967, Ser. No. 664,223
Int. Cl. H01b 7/02, 11/02, 3/08
U.S. Cl. 174—113                                6 Claims

---

ABSTRACT OF THE DISCLOSURE

Individual conductors covered with a polyester glass fabric are formed into a multiple wound loop. The loop is then covered with a silicon rubber paste and two thin polyimide films. The final product is cured for about eight hours at an elevated temperature of at least 175° C.

---

The invention described herein may be manufactured and used by or for the Government of the United States of America for governmental purposes without the payment of any royalties thereon or therefor.

BACKGROUND OF THE INVENTION

Field of invention

The present invention relates generally to electrical insulation and more particularly, to a combination of superimposed materials to provide improved electrical insulation under environmental conditions of elevated temperature and humidity.

Description of prior art

Prior art techniques for large electric machinery have utilized stator insulation which incorporated organic fibrous wrappings coated with resinous varnish. These materials, however, only provide a limited useful life whose period is unpredictable due to the fact that the insulation was unsuitable for high humidity and elevated temperature environments. Other presently used materials include siloxane polymerics which offer good heat and water resistance. A basic disadvantage, however, lies in the fact that at continuous or extended periods of high temperature, there is an acceleration of the deterioration and degradation of the silicone polymer from a resilient elastomeric dielectric to a brittle structure which disintegrates under shock or vibration. This leaves the conductor exposed to the humidity with subsequent rapid breakdown.

SUMMARY OF THE INVENTION

An electrical wire such as a stator winding is first wound with a Dacron-glass fabric and then formed into a winding. The entire winding is then completely coated with a Silastic paste so as to fill all the internal voids. The resultant structure is then wrapped with two layers of 1 or 2 mil polyimide tape having a high temperature silicone pressure sensitive adhesive on one side. The first layer is butt-wound with the second layer half lapped and butt-wound over the first. The outer or third layer comprises a fully vulcanized, self-adhering silicone tape which is approximately triangular in cross-section and butt-wound over the polymide tape. The entire structure is then cured at about 175° C. for at least 8 hours.

BRIEF DESCRIPTION OF THE DRAWINGS

In the accompanying drawings:
FIG. 1 is a perspective view with portions thereof cut away of an embodiment made in accordance with the principles of this invention;
FIG. 2 is a section taken approximately along line 2—2 of FIG. 1; and
FIG. 3 is a cross-section taken approximately along line 3—3 of FIG. 2.

DESCRIPTION OF THE PREFERRED EMBODIMENT

In the embodiment of the invention illustrated in FIGS. 1, 2 and 3, a portion of an electrical winding 10 which comprises a series of wires 11, such a magnet wire for a machine stator is to be provided with a high temperature and humidity insulation. The individual wires are covered with a polyester-glass fabric 12 or any suitable high temperature insulator which can be Dacron-glass such as that which is available as "Daglas" a trade name of Phelps Dodge, Fort Wayne, Ind. Dacron is a fiber made by the condensation of dimethyl terephthalate and ethylene glycol. Such materials are readily available in the commercial market. The wires are then coated with or encapsulated in a silicone rubber paste 13 which effectively fills all the voids and the interstices between the wires so as to preclude any atmosphere from being entrapped therein. This silicone paste is available from various sources. One such material which has proven satisfactory is manufactured by Dow Corning under the trade name "Silastic."

There is now wound about the structure two layers of polyimide tape, each being about 1 to 2 mils thick. This is generally an aromatic polyimide such as "Kapton," trademark of E. I. du Pont de Nemours & Company, of the special purpose "H" film manufactured by The Borden Chemical Company of Northfield, Ill. One side of the tape is coated with a pressure sensitive silicone adhesive. The first layer of polyimide tape 14 is spirally butt-wound and the second layer 15 is also butt-wound but half-lapped over the first layer. Sufficient tension must be applied to the tape during wrapping to ensure a smooth, void free covering over the silicon rubber paste.

The third layer 16 which is the outermost provides the sealing and the retention of the polyimide in place and serves additionally as an overall protective layer. This layer is a vulcanized, self-adhering silicone tape which is approximately triangular in cross-section and 0.020" to 0.030" thick. This layer is also lap wound over the polyimide tape while half-lapped over the outer winding 15 with tension applied during the wind so as to provide a smooth and firm wrapping. It should be noted that in the event extreme environmental conditions are to be encountered, then multiple layers of the self-adhering silicone tape 16 should be employed. This triangular tape when and when correctly positioned on the polyimide tape the half lapped on itself forms a smooth continuous surface apex 17 thereof is disposed in direct radial alignment with the butt joint of the polyimide tape. This specific disposition of the various layers relative to one another increases the range of temperature and humidity which the system can withstand before breakdown.

After assembly and winding the entire structure is cured for approximately eight hours at a temperature of at least 175° C. to complete the fusion of the silicone tape.

Evaluations of presently commercially available electrical insulation systems were conducted in accordance with the standards set forth in the appropriate military specifications. These involved the construction of identical stator coils each insulated with one of the various recently developed materials commercially available. The coils were aged for extended periods of time at a temperature of at least 275° C. Periodic high breakdown voltages were applied under controlled environments which simulate shipboard conditions. The resulting performances are tabulated below:

| Insulation system | Breakdown voltage before ageing | Breakdown voltage after ageing | Hours of ageing |
|---|---|---|---|
| #1 | 15,030 | 7,500 | 135 |
| #2 | 15,830 | 7,500 | 28 |
| #3 | 16,920 | 7,500 | 125 |
| #4 | 18,000 | 7,500 | 220 |
| #5 | 20,370 | 7,500 | 480 |
| #6 | 21,930 | 7,500 | 500 |
| System of this Invention | >30,000 | >30,000 | 624 |

These tests on the invented insulation system indicate that they possess higher electrical breakdown and heat resistances characteristics than have yet been obtained with commercially available high temeprature insulation systems. Good resistance to water penetration and humidity were also demonstrated by the tests.

It will be understood that various changes in the details, materials, and arrangement of parts (and steps), which have been herein described and illustrated in order to explain the nature of the invention, may be made by those skilled in the art within the principle and scope of the invention as expressed in the appended claims.

I claim:
1. An insulated conductor system comprising
   a plurality of adjacent electrical conductors,
   a layer of glass-polyester fabric over each of said conductors, and in succession over said plurality of conductors,
   a layer of silicone rubber paste covering said conductors and filling the voids and spaces therebetween,
   a first butt-lapped layer of polyimide tape in contact with the layer of glass-polyester fabric over said plurality of conductors,
   a second butt-lapped layer of polyimide tape half-lapped over said first polyimide layer, and
   an outer butt-lapped layer of fully vulcanized, self-adhering silicone tape,
   said insulating system having been cured to bond said silicone tape and paste.

2. The insulating system according to claim 1 wherein said fabric is glass in combination with a fiber made by the condensation of dimethyl terephthalate and ethylene glycol.

3. The insulating system according to claim 2, wherein said polyimide tape is provided with a pressure sensitive silicone adhesive on one side thereof.

4. The insulating system according to claim 3, wherein said outer layer is half-lapped over said second of polyimide layer.

5. The insulating system according to claim 4, wherein said outer layer is approximately triangular in cross-section and spirally half-lapped upon itself to provide a layer of constant thickness.

6. The insulating system according to claim 5, wherein said system is cured at approximately 175° C. for eight hours.

References Cited

UNITED STATES PATENTS

| 2,553,362 | 5/1951 | Dannenberg | 336—205 |
| 2,553,666 | 5/1951 | McKechnie | 336—205 |
| 2,789,155 | 4/1957 | Marshall | 174—170 |
| 3,230,121 | 1/1966 | Mitzsche. | |

E. A. GOLDBERG, Primary Examiner

U.S. Cl. X.R.

156—55; 174—120, 121, 124; 336—205